US010312785B2

(12) United States Patent
Helbling et al.

(10) Patent No.: US 10,312,785 B2
(45) Date of Patent: Jun. 4, 2019

(54) DOMESTIC APPLIANCE

(71) Applicant: Sysko AG, Chur (CH)

(72) Inventors: Norbert Helbling, Jona (CH); Michael Wisskirchen, Bad Wurzach (DE); Fred Partzsch, Neukirch (DE)

(73) Assignee: Sysko AG, Chur (CH)

( * ) Notice: Subject to any disclaimer, the term of this patent is extended or adjusted under 35 U.S.C. 154(b) by 0 days.

(21) Appl. No.: 15/771,439

(22) PCT Filed: Oct. 28, 2016

(86) PCT No.: PCT/EP2016/076118
§ 371 (c)(1),
(2) Date: Apr. 27, 2018

(87) PCT Pub. No.: WO2017/072314
PCT Pub. Date: May 4, 2017

(65) Prior Publication Data
US 2018/0323692 A1    Nov. 8, 2018

(30) Foreign Application Priority Data

Oct. 29, 2015   (DE) .................. 10 2015 118 529

(51) Int. Cl.
| H02K 33/10 | (2006.01) |
| A47J 31/46 | (2006.01) |
| F04B 17/04 | (2006.01) |
| H01F 7/16 | (2006.01) |
| H01F 7/08 | (2006.01) |

(52) U.S. Cl.
CPC ............ *H02K 33/10* (2013.01); *A47J 31/46* (2013.01); *A47J 31/468* (2018.08); *F04B 17/046* (2013.01); *H01F 7/1615* (2013.01); *H01F 2007/086* (2013.01); *H02K 2201/12* (2013.01)

(58) Field of Classification Search
CPC ............................. H02K 33/10; F04B 17/046
See application file for complete search history.

(56) References Cited

U.S. PATENT DOCUMENTS

| 2,458,770 A | 1/1949 | Dickey et al. |
| 3,293,516 A | 12/1966 | Maier |
| (Continued) | | |

FOREIGN PATENT DOCUMENTS

| CH | 416 330 A | 1/1967 |
| DE | 16 53 516 A1 | 8/1971 |
| (Continued) | | |

OTHER PUBLICATIONS

German Search Report dated Feb. 26, 2016 issued in corresponding DE patent application No. 10 2015 118 529.6 (and partial English translation).

(Continued)

*Primary Examiner* — Dang D Le
(74) *Attorney, Agent, or Firm* — Posz Law Group, PLC

(57) ABSTRACT

A domestic appliance, in particular a beverage dispenser machine, with a beverage pump having at least one pole sleeve for conducting a magnetic flux generated by a magnetic actuator, wherein the pole sleeve has, along a main flow direction of the liquid, a substantially changing magnetic permeability, wherein the pole sleeve has a reduced magnetic permeability in an axial edge region.

18 Claims, 8 Drawing Sheets

(56) References Cited

U.S. PATENT DOCUMENTS

Figure 1:
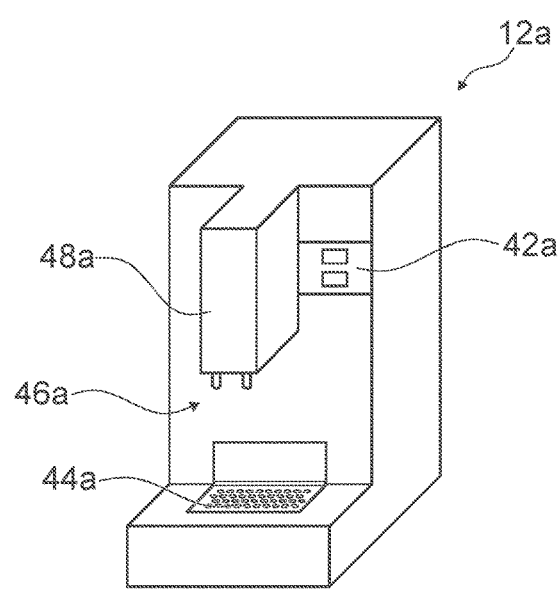

| | | | | |
|---|---|---|---|---|
| 3,894,817 | A * | 7/1975 | Majoros | F04B 17/046 |
| | | | | 310/30 |
| 6,833,637 | B2 * | 12/2004 | Park | H02K 33/16 |
| | | | | 310/12.01 |
| 7,898,121 | B2 * | 3/2011 | Ramsay | H02K 41/031 |
| | | | | 310/101 |
| 2006/0145797 | A1 | 7/2006 | Muramatsu et al. | |

FOREIGN PATENT DOCUMENTS

| | | |
|---|---|---|
| DE | 200 19 406 U1 | 1/2001 |
| DE | 1 336 751 B1 | 5/2006 |
| DE | 10 2013 107 481 A1 | 1/2015 |

OTHER PUBLICATIONS

International Search Report of the International Searching Authority dated Jan. 2, 2017 for the corresponding international application No. PCT/EP2016/076118.

International Preliminary Report on Patentability of the International Searching Authority dated May 3, 2018 for the corresponding international application No. PCT/EP2016/076118.

\* cited by examiner

DOMESTIC APPLIANCE

CROSS REFERENCE TO RELATED APPLICATIONS

This application is a U.S. national stage application of PCT/EP2016/076118 filed on Oct. 28, 2016, which is based on and claims priority to German Patent Application No. 10 2015 118 529.6 filed on Oct. 29, 2015, the contents of which are incorporated herein by reference.

STATE OF THE ART

The invention relates to a domestic appliance with a beverage pump.

A beverage pump for a domestic appliance, in particular for a beverage dispenser machine, for the purpose of conveying a liquid, with at least one pole sleeve for conducting a magnetic flux generated by a magnetic actuator, has already been proposed.

The objective of the invention is in particular to provide an especially effective and cost-efficient beverage pump. The objective is achieved according to the invention by the features of patent claim 1 while advantageous implementations and further developments of the invention may be gathered from the subclaims.

Advantages of the Invention

The invention is based on a domestic appliance, in particular a beverage dispenser machine, with a beverage pump for the purpose of conveying a liquid, wherein the beverage pump comprises at least one pole sleeve for conducting a magnetic flux generated by a magnetic actuator.

It is proposed that the pole sleeve has along a main flow direction of the liquid, a substantially changing magnetic permeability.

In this way an advantageous characteristic progression of a magnetic force acting onto an armature is achievable. A particularly effective beverage pump may be made available. An effective beverage pump is achievable with a small quantity of metal, in particular with a small quantity of copper, of a coil of the magnetic actuator, as a result of which an especially cost-effective beverage pump may be made available. By a "beverage dispenser machine" is in particular, in this context, an automatic machine to be understood which is configured for portion-wise dispensing and/or preparing of beverages, e.g. coffee, tea, cocoa, and/or other dairy mix drinks and/or brewed drinks. Preferably the beverage dispenser machine is embodied as a coffee dispenser machine, preferably a fully automatic coffee dispenser. Preferentially the beverage pump is embodied as an oscillating armature pump. The beverage pump preferably comprises at least one float-supported working piston, which is configured to be driven in particular by the magnetic flux conducted by the pole sleeve. In particular, the working piston is configured for a stop-free movement in a pump chamber. The working piston is preferably configured for a movement at least substantially in parallel to a middle axis of the pole sleeve.

Preferentially the beverage pump is embodied as a high-pressure oscillating armature pump and is configured to provide a pressure of at least 10 bar, preferably at least 15 bar. It is also conceivable that the beverage pump is embodied as a low-pressure oscillating armature pump and is configured to provide a pressure of at least 3 bar. In particular, the beverage pump is embodied as a domestic-appliance oscillating armature pump.

Preferably the beverage pump is embodied as a beverage dispenser pump. Preferentially the beverage pump features an iron circuit comprising at least one pole sleeve. The pole sleeve is preferably embodied at least substantially tube-shaped, e.g. as a rolled part. It is conceivable that the pole sleeve is implemented to be slitted, i.e. having a slit, which extends in an axial direction. The beverage pump in particular comprises a pump chamber in which the working piston is guided. Preferably the pole sleeve has the shape of a hollow cylinder and comprises a middle axis. The pole sleeve encompasses the pump chamber. The pole sleeve is preferentially arranged outside the pump chamber. Terms designating a direction, like "axial/axially", "radial/radially", "in a circumferential direction" are to be understood with reference to a middle axis of the pump chamber and/or with reference to the middle axis of the pole sleeve. "Axial/axially" is to mean in a direction of the middle axis of the pump chamber and/or in a direction of the middle axis of the pole sleeve. By a "main flow direction" is in particular, in this context, a direction to be understood in which the liquid that is to be conveyed moves, averaged over a time period, e.g. over the duration of a portion output. In particular, the main flow direction is equivalent to the axial direction. In particular, the pole sleeve has a substantially changing magnetic permeability along an axial direction. "Radial/radially" is to mean in particular, in this context, a direction that is perpendicular to the middle axis of the pole sleeve and/or perpendicular to the middle axis of the pump chamber, starting from the respective middle axis outward. "In a circumferential direction" is in particular to mean, in this context, along a circle arc around the middle axis of the pole sleeve and/or around the middle axis of the pump chamber, in a plane that is perpendicular to the middle axis of the pole sleeve and/or perpendicular to the middle axis of the pump chamber. By the magnetic permeability "changing substantially" is in particular to be understood, in this context, that values of the magnetic permeability differ, in points which are spaced apart in an axial direction, by at least 20%, preferably by at least 40%, preferentially by at least 60% and especially preferentially by at least 80%. "Configured" is in particular to mean specifically programmed, designed and/or equipped. By an object being configured for a certain function is in particular to be understood that the object fulfills and/or implements said certain function in at least one application state and/or operating state.

The pole sleeve has, in an axial edge region, a reduced magnetic permeability. This allows especially advantageously adjusting a stroke height of an armature. It is possible to render a beverage pump available which is particularly flexibly adaptable. By an "axial edge region" is to be understood, in this context, a region of the pole sleeve which is delimited by an axial edge of the pole sleeve. In a mounted state the axial edge region is preferably arranged on an end of the pole sleeve that is oriented downstream with respect to the main flow direction. Preferentially the axial edge region is arranged on an outlet-side end of the pole sleeve. Preferably, in a rest position of a working piston the axial edge region is arranged on an end of the pole sleeve that faces towards the working piston. Preferentially, in the axial edge region the magnetic permeability decreases towards the edge at least substantially monotonously. Preferably, in the axial edge region the magnetic permeability decreases towards the edge at least substantially continuously. A "magnetic permeability" is in particular to mean, in this context, an extensive quantity. It is conceivable that the extensive magnetic permeability decreases due to a decrease of an intensive magnetic permeability, e.g. due to a material composition in the pole sleeve changing in the axial direction. Preferably the pole sleeve is made at least substantially of a ferromagnetic material. Preferentially the pole sleeve is made at least substantially of steel, preferably of unalloyed high-grade steel. It is conceivable that the pole sleeve comprises in its axial edge region at least one further material, e.g. an alloy and/or a synthetic material.

It is further proposed that the pole sleeve has a reduced effective wall material volume in its axial edge region. This in particular allows achieving a particularly simple and/or cost-efficient manufacturing process. It is possible to provide an especially cost-competitive pole sleeve. By a "reduced effective" wall material volume is in particular, in this context, a wall material volume to be understood which is reduced in regard to its magnetic impact.

The wall material volume is, for example, reduced due to a milling process or by a Waelz process.

Advantageously the axial edge region of the pole sleeve is embodied in a sinuate manner. This allows further simplifying of the production process. The pole sleeve is producible cost-effectively in a punching process. "Sinuate" is in particular to mean, in this context, provided with at least one incision. Preferably the pole sleeve has at least two different heights along a circumferential direction. Preferably the pole sleeve has at least two different values for an axial extension along a circumferential direction. Preferentially the edge region has a plurality of incisions, e.g. at least two, three, four, five or six incisions. Preferably the incisions are implemented analogously to one another and/or have the same incision depth. It is conceivable that the incisions are implemented differently and, for example, incisions having differing incision depths may alternate along a circumferential direction. Preferentially the incisions are arranged in such a way that they are distributed at least substantially regularly at the edge region along a circumferential direction. The edge region preferably has an at least substantially periodic contour. It is conceivable that the axial edge region is implemented in an undulating or serrate fashion. Preferably the axial edge region is embodied crown-shaped. The incisions are preferably implemented in trapezoid shape.

Furthermore it is proposed that the pole sleeve has a reduced wall thickness in the axial edge region. As a result, it is possible to provide a pole sleeve which is implemented in a particularly stable fashion in the axial edge region. The pole sleeve in particular has an axial section profile, which has the reduced wall thickness in the axial edge region. An "axial section profile" is in particular to mean, in this context, a profile along a section in a plane that is parallel to the middle axis of the pole sleeve. By a "reduced" wall thickness is in particular, in this context, a wall thickness to be understood which changes, in particular tapers, in regard of an axial direction. Preferentially the wall thickness decreases in the axial edge region at least substantially monotonously towards the edge. In particular the wall thickness has differing values in at least two points which are axially spaced apart from each other. The axial section profile preferably has a symmetry axis coinciding with the middle axis of the pole sleeve. Preferentially the pole sleeve is implemented at least substantially in a rotationally symmetrical manner.

It is also proposed that the pole sleeve has a basis wall thickness with respect to which the wall thickness is reduced in the axial edge region. In this way an especially simple implementation of the pole sleeve is achievable. A pole sleeve may be produced from a cylindrical blank. A particularly cost-competitive production process is achievable. A "basis wall thickness" is in particular to mean a wall thickness which is at least substantially constant in an axial section. By a "constant wall thickness" is in particular to be understood, in this context, that the wall thickness is constant with respect to an axial displacement. Preferentially the basis wall thickness is at least substantially constant over a quarter, preferably over a third, especially preferably over half of an axial longitudinal extension. "At least substantially constant" is in particular to mean, in this context, having deviations by less than 2%, preferably deviations by less than 1% and especially preferentially deviations by less than 0.5%. Preferably the pole sleeve has a maximum wall thickness that is equivalent to the basis wall thickness. The basis wall thickness is preferentially at least 1.0 mm, preferably at least 2.0 mm, particularly preferably at least 2.5 mm and very particularly preferably at least 3.0 mm. Preferably, in the axial edge region the wall thickness is at least substantially contiguously reduced with respect to a basis wall thickness and/or with respect to a maximum wall thickness. Preferentially the axial edge region is delimited by at least one shaped element, like for example a groove, a step, and/or an edge, in particular an edge of a slope. Preferably a region having the basis wall thickness is arranged directly next to the axial edge region in an axial direction.

The beverage pump advantageously comprises at least one further pole sleeve, which is arranged in such a way that it is spaced apart from the pole sleeve by a gap. This allows further increasing an efficiency of the beverage pump. In particular, the iron circuit comprises the pole sleeve and the further pole sleeve. A "gap" is in particular to mean, in this context, a magnetically insulating gap. Preferably the gap is in a mounted state filled with a magnetic insulator, like for example air, rubber, a synthetic material and/or a cellulose-containing material. Preferentially the axial edge region is in a mounted state arranged on an end of the pole sleeve which faces towards the gap. The at least one further pole sleeve preferably has a basis wall thickness that is equivalent to the basis wall thickness of the pole sleeve. The pole sleeve and the further pole sleeve preferentially have a same inner circumference. Preferably the pole sleeve is arranged inlet-side with respect to the further pole sleeve.

In an advantageous implementation the pole sleeve has an axial section profile derived from a force-displacement characteristic. As a result, it is possible to provide a beverage pump which is advantageously flexibly adjustable. Heating-up of the beverage pump during operation may be kept at a low level. A constant performance of the beverage pump is achievable. A high degree of user comfort is achievable. A "force-displacement characteristic" is in particular to mea, in this context, a characteristic and/or dependency representing a force acting onto a working piston of the oscillating armature pump due to magnetic flux, in a relation to an axial position of the working piston. The section profile preferably comprises at least one shaped element, in particular at least a step and/or a slope, with at least one geometric parameter derived from the force-displacement characteristic. Preferentially, in an optimizing process the wall thickness in the edge region of the axial section profile is reduced, e.g. starting from a rectangular section profile, in particular via chamfering, and the effect thereof onto the force-displacement characteristic and/or onto a pressure-volumetric flow rate characteristic of the oscillating armature pump is evaluated. In further method steps the wall thickness is further reduced until the force-displacement characteristic and/or onto a pressure-volumetric flow rate characteristic of the oscillating armature pump do not improve further. In particular, a force maximally acting onto the working piston in a stroke is reduced. Preferentially the axial section profile is derived from a value and/or a gradient of the force-displacement characteristic in a region of the magnetically insulating gap, and/or from a value and/or a gradient of the force-displacement characteristic on the edge of the pole sleeve.

Moreover it is proposed that the axial section profile comprises at least one slope and/or a multiple stepping. Thus a shape of the magnetic flux is advantageously adjustable, in particular in a region of the magnetically insulating gap. A particularly favorable progression of a magnetic force acting onto a working piston of the beverage pump is achievable, in particular in a region of the magnetically insulating gap. Preferably the wall thickness has a minimum on an edge of the pole sleeve facing towards the magnetically insulating gap, said minimum being arranged on an edge of the slope. In the axial edge region the wall thickness preferentially has an at least substantially monotonous course, i.e. the wall thickness increases with a distance from the edge of the pole sleeve. The axial section profile is preferably implemented by maximally two convex surfaces, which are preferentially implemented and arranged mirror-symmetrically to one another. Preferably the slope and/or the multiple stepping are/is arranged on an outer perimeter of the pole sleeve. It is also conceivable that the slope and/or the multiple stepping are/is arranged on an inner perimeter of the pole sleeve. It is also conceivable that the axial section profile respectively has at least one slope and/or multiple stepping on an outer perimeter as well as on an inner perimeter. The axial section profile preferably has at least two slopes, which are implemented and/or arranged symmetrically to one another, in particular with respect to a symmetry axis.

In an advantageous implementation the axial edge region has an axial extension with a value of at least 2 mm. As a result of this, a magnetic flux, in particular a magnetic flux in a region of the magnetically insulating gap, is modifiable in a particularly effective manner. It is possible to restrict a strain on structural components of the beverage pump. A beverage pump having an especially long service life may be rendered available. The axial extension of the axial edge region preferentially has a value of at least 3 mm, preferably at least 4 mm and particularly preferably at least 5 mm. The axial extension of the axial edge region is preferentially at least 20%, preferably at least 25% and especially preferentially at least 30% of a total axial extension of the pole sleeve.

Beyond this it is proposed that the axial edge region has an axial extension with a value of maximally 10 mm. This allows reducing a force gradient relative to an axial position, in particular in the region of the magnetically insulating gap, in an especially effective manner. The axial extension of the axial edge region preferably has a value of maximally 8 mm, preferentially of maximally 6 mm and particularly preferably of maximally 5 mm.

Preferably a ratio of a basis wall thickness and the axial extension of the axial edge region has a value between 0.5 and 2.5. Preferentially the axial extension of the axial edge region is maximally 90%, preferably maximally 70% and especially preferentially maximally 50% of a distance of an armature of the oscillating armature pump from an edge of the pole sleeve that faces towards the armature in a rest position of the armature.

Preferably the axial extension of the axial edge region is at least 10%, preferentially at least 20% and particularly preferably at least 40% of a distance of an armature of the oscillating armature pump from an edge of the pole sleeve faxing towards the armature in a rest position of the armature. By a "rest position of the armature" is in particular, in this context, a position of the armature to be understood which is taken by the armature in case of a switched-off magnet coil, in particular due to an equilibrium of forces of spring elements acting onto the armature. The axial extension of the axial edge region is preferably maximally 50%, preferentially maximally 40%, and particularly preferably maximally 30% of a maximum axial extension of the pole sleeve.

In an advantageous implementation the axial section profile comprises at least one slope, which includes an angle of no more than 30 degrees with a middle axis of the pole sleeve. In this way an especially large wall thickness of the pole sleeve is achievable. A course of a force-displacement characteristic is adjustable particularly precisely. Preferably the slope includes an angle with the middle axis of maximally 25 degrees, preferentially maximally 20 degrees and especially preferentially maximally 15 degrees. The axial section profile preferentially comprises at least two slopes, each of which includes an angle of maximally 30 degrees with a middle axis of the pole sleeve and is implemented and/or arranged symmetrically, in particular with respect to a symmetry axis.

In an advantageous implementation the axial section profile comprises at least one section having a constant reduced wall thickness and having an axial extension of at least 2 mm. This allows rendering a particularly simply structured pole sleeve available. A pole sleeve may be manufactured of at least two cylindrical elements in an especially cost-efficient fashion. Preferentially the section of the axial section profile is embodied in a rectangular fashion. The axial section profile preferably has at least two sections having a constant reduced wall thickness, which are preferably embodied in a rectangular fashion, and which are implemented and/or arranged symmetrically to one another, in particular with respect to a symmetry axis. Preferably the section is arranged directly adjacent to a section having a basis wall thickness. Preferentially the axial section profile has a step at an edge of the section. A "step" is in particular to mean, in this context, a jump between two values of a wall thickness, a radius and/or a diameter. In particular, two cross sections arranged, with respect to an axial direction, on different sides of the step have different wall thicknesses, different radii and/or different diameters. A "cross section" is in particular to mean, in this context, a section along a plane perpendicularly to an axial direction. The pole sleeve is preferably embodied in a multi-part implementation, comprising a first cylinder element with the basis wall thickness of the pole sleeve and at least one further cylinder element, which is arranged in the section and has a wall thickness that is smaller than the basis wall thickness, in particular smaller than a wall thickness of the first cylinder element. The section preferentially has an axial extension of at least 3 mm, preferably at least 4 mm and particularly preferably at least 5 mm. Preferentially the step is arranged on an outer perimeter.

Beyond this it is proposed that the axial section profile comprises at least one step, which has a height of at least 0.2 mm. This allows achieving a particularly compact axial section profile. The step preferentially has a height of at least 0.3 mm, preferably at least 0.4 mm and particularly preferably at least 0.5 mm. Preferentially the step is arranged on an edge of the axial edge region, in particular an edge of the axial edge region that faces away from the edge of the pole sleeve. The axial section profile preferably comprises a combination of at least one step and at least one slope. Preferentially the axial section profile comprises at least two steps, each of which has a height of at least 0.2 mm and is implemented and/or arranged symmetrically to one another, in particular with respect to the symmetry axis.

It is also proposed that the pole sleeve has a constant inner diameter at least in the axial edge region. In this way a particularly small distance is achievable between the pole sleeve and the pump chamber. An efficiency of the beverage pump is even further increasable. "Constant" is in particular to mean, in this context, constant with regard to an axial displacement, in particular with regard to cross sections which are offset from one another in an axial direction.

In an advantageous implementation the axial section profile comprises at least one step on an inner perimeter. An especially small minimum distance is achievable between the pole sleeve and an armature element of the beverage pump, in a movement of the working piston. As a result of this, an electrical energy is convertible into a kinetic energy of the working piston in a particularly effective fashion. An efficiency of the beverage pump is further increasable.

By way of the domestic appliance, in particular the beverage dispenser machine, with the beverage pump according to the invention, an especially efficient domestic appliance may be made available. An output duration may be kept at least substantially constant over a plurality of portion output procedures. A high level of user comfort is achievable.

The beverage pump according to the invention and/or the domestic appliance according to the invention are/is herein not to be limited to the application and implementation described above. In particular, to fulfill a functionality that is herein described, the machine tool device according to the invention and/or the method according to the invention may comprise a number of individual elements, structural components and units as well as method steps that differs from a number herein mentioned. Moreover, regarding the value ranges given in the present disclosure, values situated within the mentioned delimitations are also to be considered to be disclosed and to be insertable according to requirements.

DRAWINGS

Further advantages will become apparent from the following description of the drawings. The drawings show five exemplary embodiments of the invention. The drawings, the description and the claims contain a plurality of features in combination. Someone skilled in the art will purposefully also consider the features separately and will find further expedient combinations.

Figure 2:
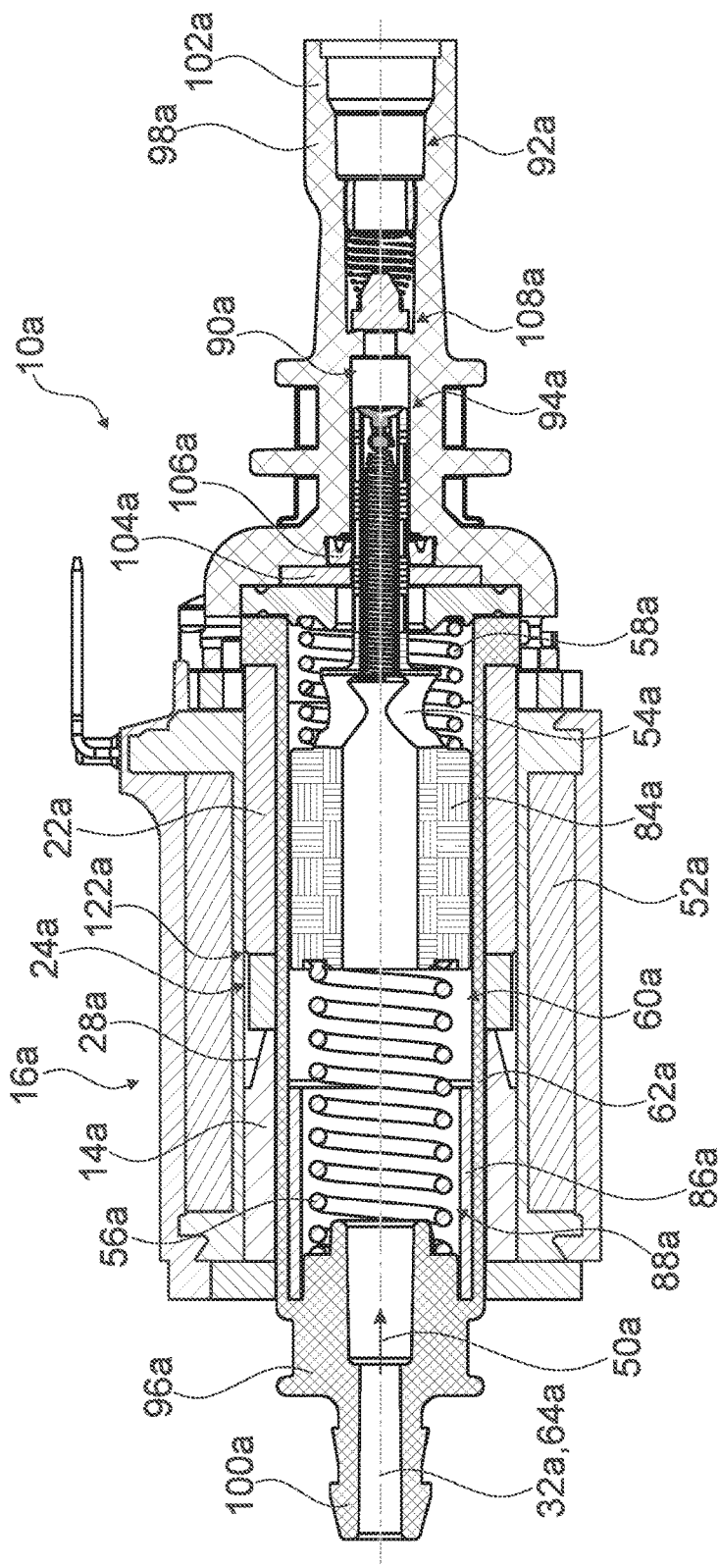
Figure 3:
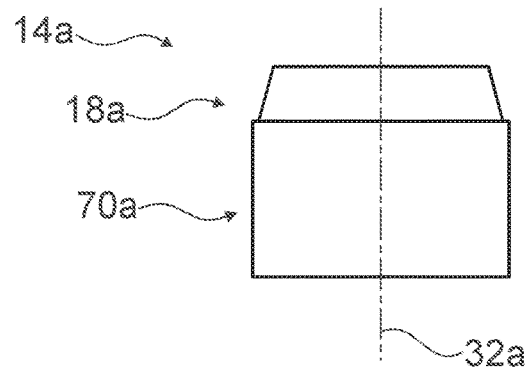
Figure 4:
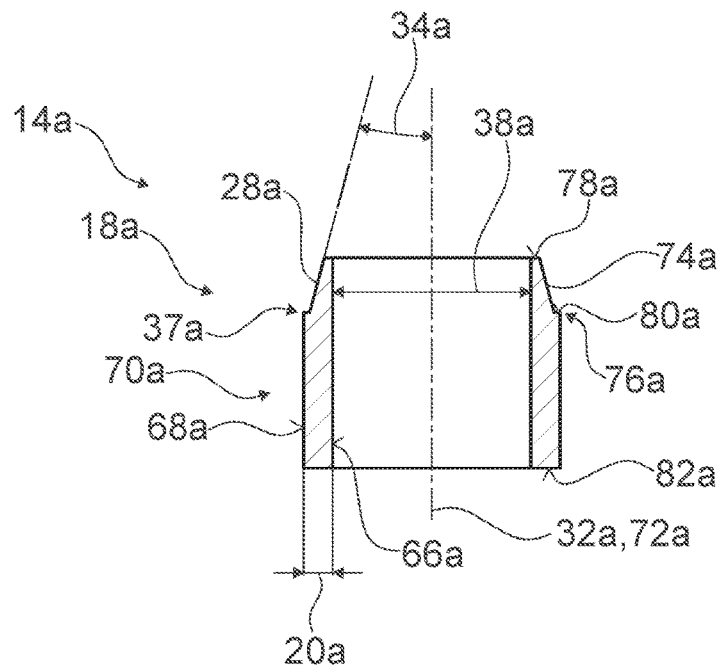
Figure 5:
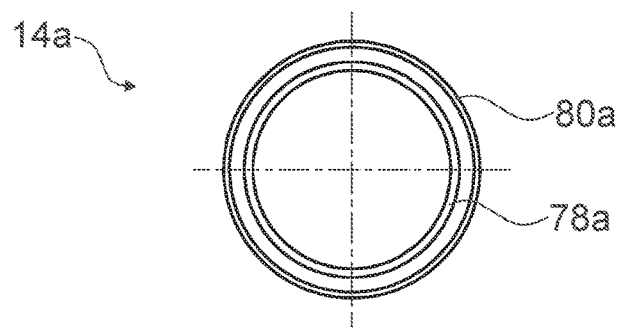
Figure 6:
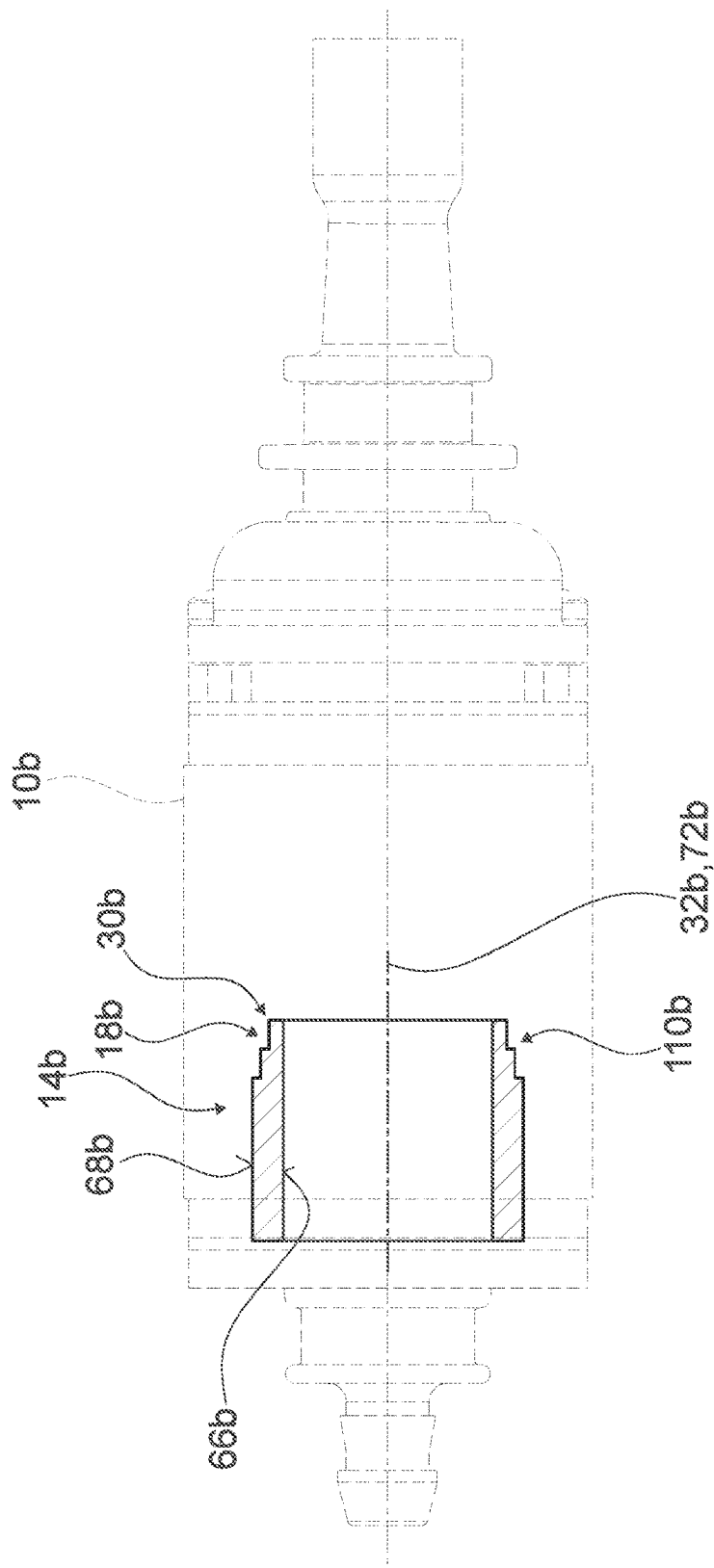
Figure 7:
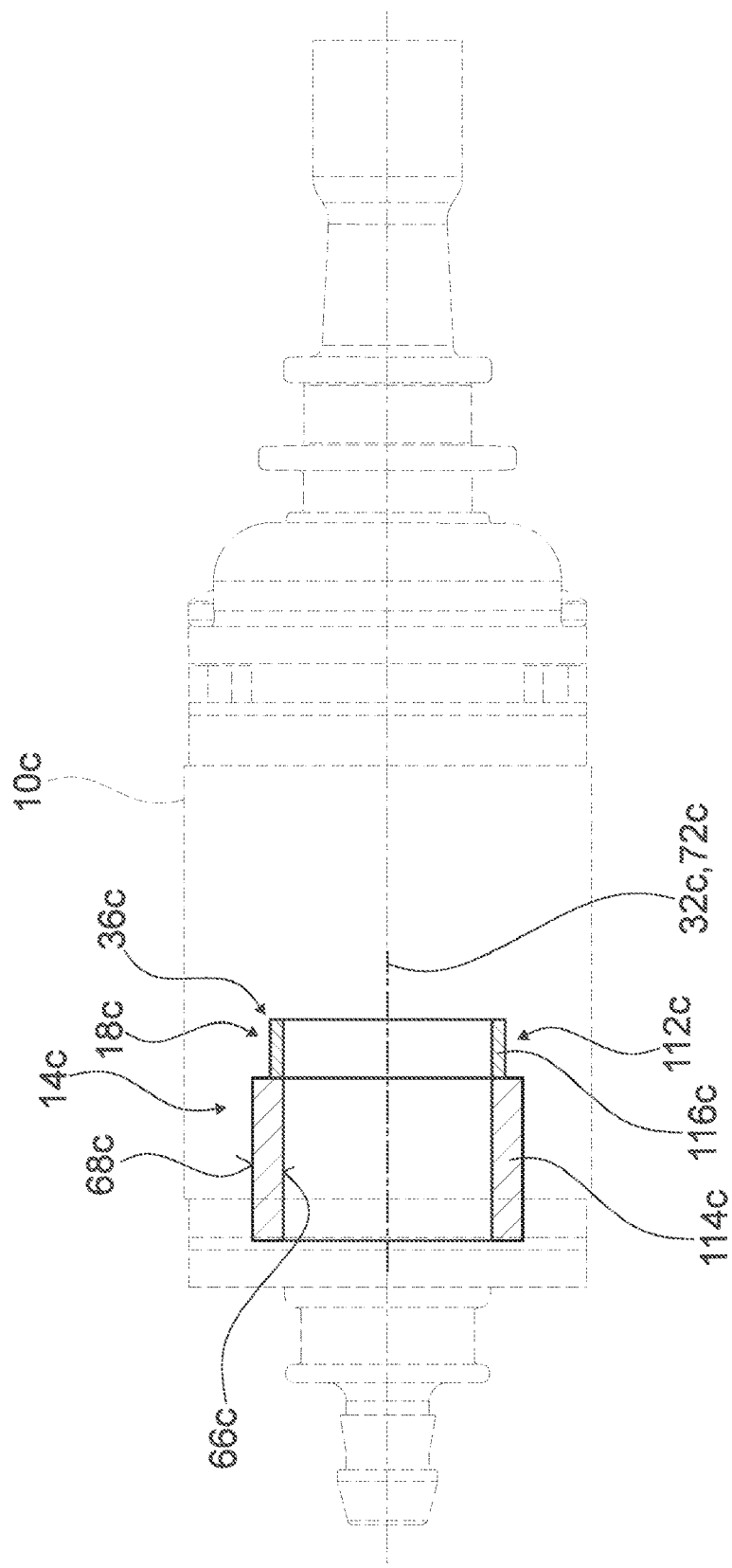
Figure 8:
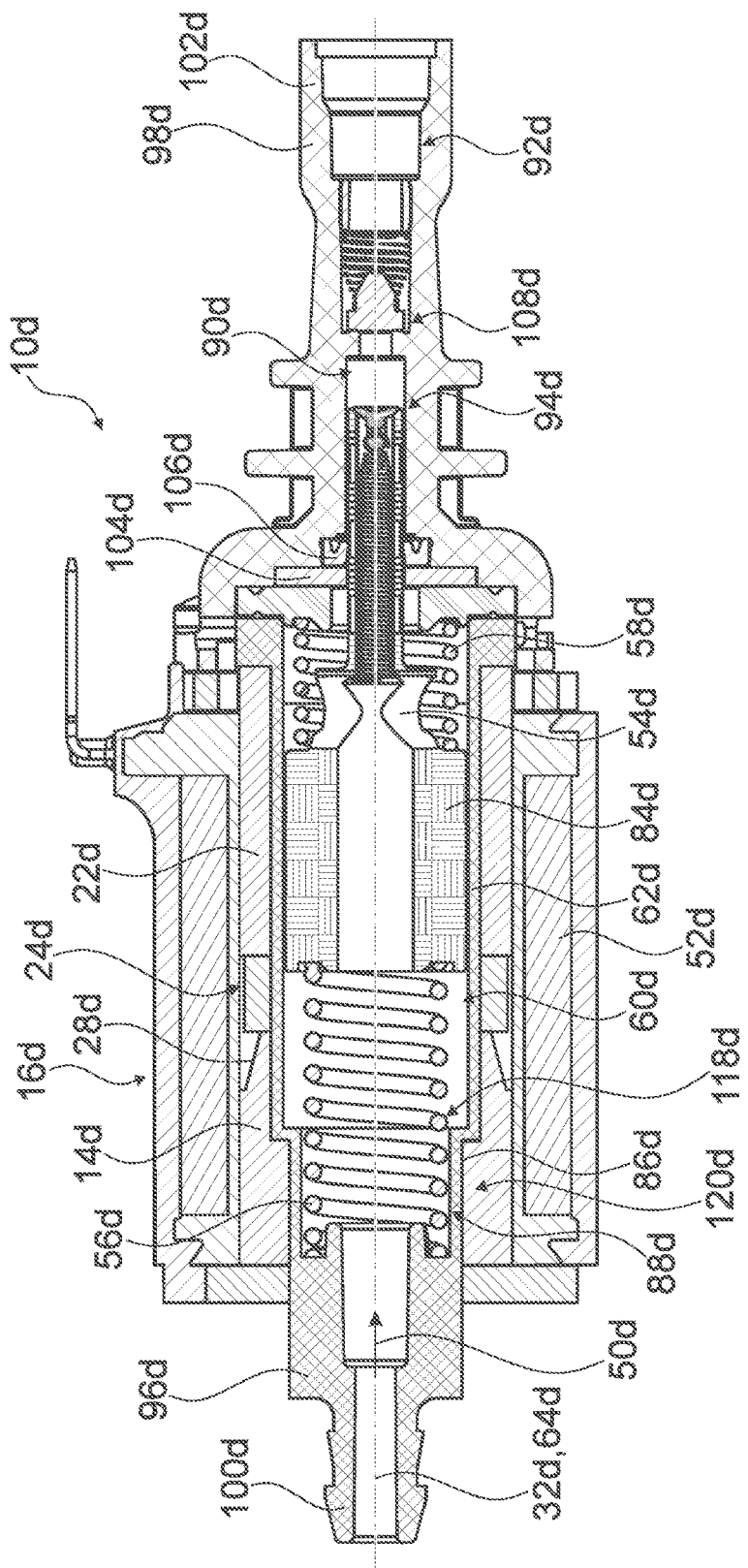
Figure 9:
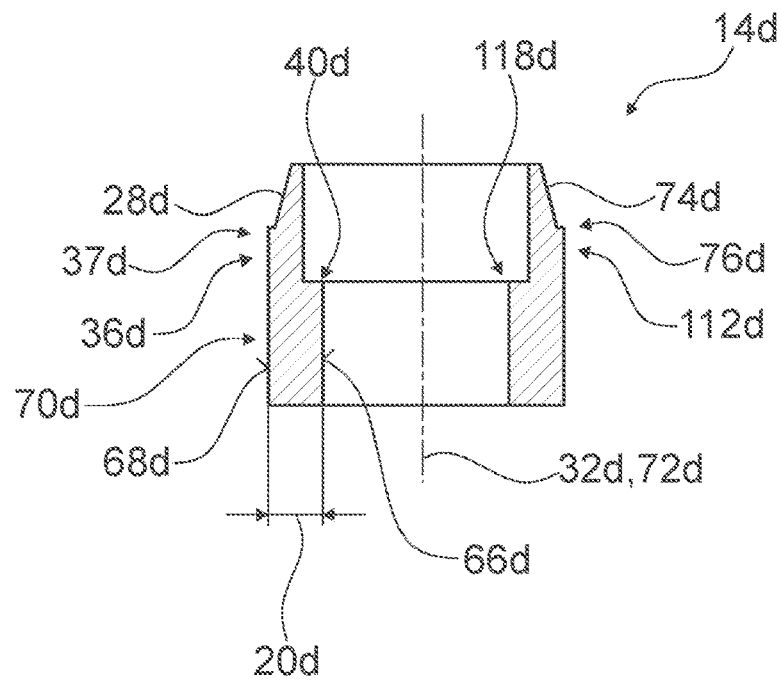
Figure 10:
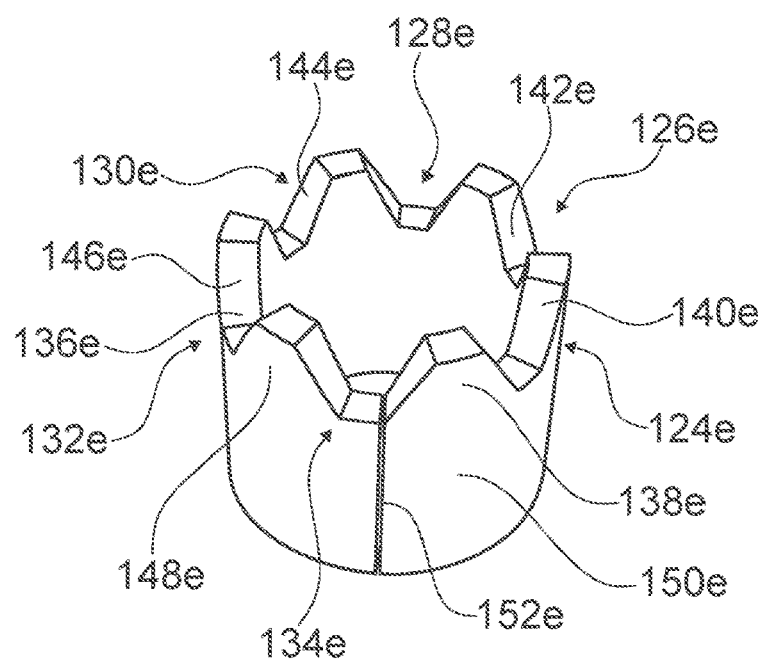
Figure 11:
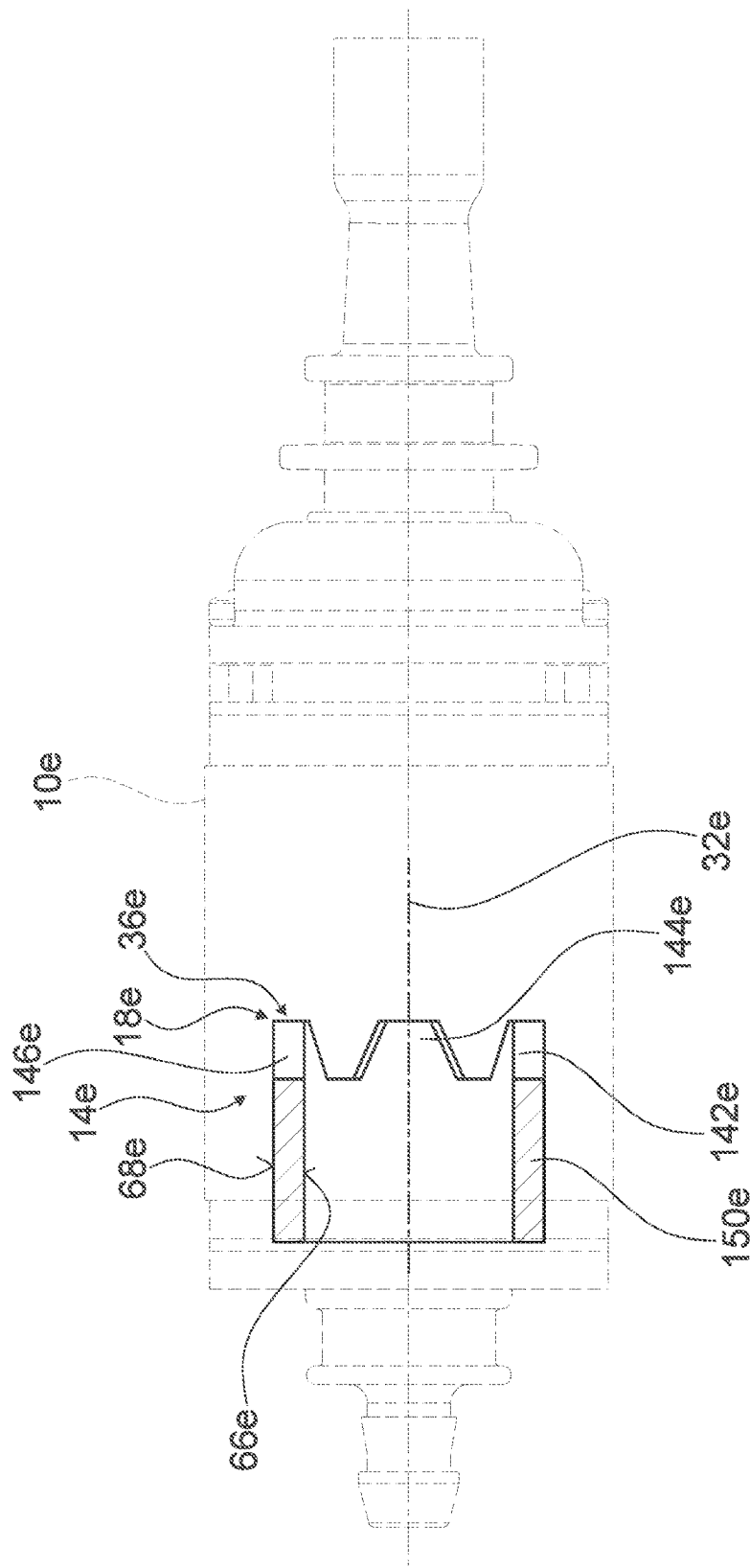

It is shown in:

FIG. 1 a representation of a domestic appliance according to the invention,

FIG. 2 a section along a longitudinal axis through a beverage pump of the domestic appliance, FIG. 3 a lateral view of a pole sleeve of the beverage pump, FIG. 4 a section of the pole sleeve along an axial direction, FIG. 5 a view of the pole sleeve from above, FIG. 6 a section of a pole sleeve for a further exemplary embodiment with a multiple stepping, FIG. 7 a section of a pole sleeve for a further exemplary embodiment with a plurality of sleeve elements, FIG. 8 a section through a beverage pump along a longitudinal axis for an exemplary embodiment of a pole sleeve with a step on an inner perimeter, FIG. 9 a longitudinal section of the pole sleeve, FIG. 10 a perspective view of a pole sleeve for another exemplary embodiment, with a crown-shaped edge region, and FIG. 11 a section, along a longitudinal axis, through a beverage pump with the pole sleeve having the crown-shaped edge region.

DESCRIPTION OF THE EXEMPLARY EMBODIMENTS

FIG. 1 shows a domestic appliance 12a, which is embodied as a beverage dispenser machine. In the present exemplary embodiment the domestic appliance 12a is configured for preparing beverages portion-wise and for dispensing beverage portions. The domestic appliance 12a is embodied as fully automatic coffee dispenser. The domestic appliance 12a comprises storage containers for water and for coffee, which are not shown in detail. The domestic appliance 12a comprises a control unit 42a, which is configured for a user input. The domestic appliance 12a comprises a drip tray 44a and a recipient accommodation 46a. The domestic appliance 12a comprises a dispensing unit 48a for dispensing beverage portions, in particular into a recipient arranged in the recipient accommodation 46a. The domestic appliance 12a comprises a beverage pump 10a (cf. FIG. 2). The beverage pump 10a is configured for conveying a liquid, e.g. water, under a pressure of at least 12 bar. The beverage pump 10a is configured for conveying a liquid counter to a dynamic pressure of 12 bar. It is conceivable that the beverage pump 10a is configured for conveying a liquid at a smaller pressure, e.g. a pressure of at least 8 bar, 7 bar or 4 bar. It is also conceivable that the beverage pump 10a is configured for conveying a liquid at a higher pressure of, for example, 15 bar. The beverage pump 10a is configured to convey the liquid in a main flow direction 50a.

The beverage pump 10a comprises a magnetic actuator 16a with a magnet coil 52a. The beverage pump 10a comprises a working piston 54a. The magnetic actuator 16a is configured to provide a magnetic field for driving the working piston 54a. The working piston 54a is float-supported. The beverage pump 10a comprises two spring elements 56a, 58a acting onto the working piston 54a. The spring elements 56a, 58a are configured to act onto the working piston 54a in mutually opposite directions. One of the spring elements 56a is embodied as a pump spring. The spring element 56a, which is embodied as a pump spring, is configured to drive the working piston 54a in a pressure stroke. The spring element 56a is embodied as a helical compression spring. The beverage pump 10a comprises a pump chamber 60a, in which the working piston 54a is guided movably. The pump chamber 60a comprises a pump chamber wall 62a, which is embodied as a piston guidance. The pump chamber 60a penetrates the coil housing with the magnet coil 52a. The magnet coil 52a is configured to generate a magnetic field, which partially permeates the pump chamber 60a. The pump chamber 60a is in the present embodiment implemented in such a way that it is at least substantially cylindrical. The pump chamber 60a has a middle axis 64a, which is equivalent to a cylinder axis and is oriented at least substantially in parallel to the main flow direction 50a.

For the purpose of directing the magnetic field, the beverage pump 10a comprises an iron circuit partially encompassing the magnet coil 52a. The iron circuit comprises at least one pole sleeve 14a to guide a magnetic flux generated by the magnetic actuator 16a (cf. FIG. 3). The pole sleeve 14a is implemented at least substantially in the shape of a hollow cylinder. The pole sleeve 14a has a middle axis 32a, which is equivalent to a cylinder axis. The pole sleeve 14a features an inner perimeter 66a and an outer perimeter 68a. In a mounted state, the middle axis 64a of the pump chamber 60a and the middle axis 32a of the pole sleeve 14a coincide at least substantially. In a mounted state the pole sleeve 14a is arranged coaxially to the pump chamber 60a. The pole sleeve 14a is in the present embodiment embodied as a rotary part. It is conceivable that the pole sleeve 14a has been produced with a different method and is, for example, embodied as a rolled part. The pole sleeve 14a is in the present exemplary embodiment implemented to be rotationally symmetrical.

The pole sleeve 14a has a substantially changing magnetic permeability along the main flow direction 50a of the liquid that is to be conveyed. In an axial edge region 18a, the pole sleeve 14a has a reduced magnetic permeability. In the axial edge region 18a, the pole sleeve 14a has a reduced effective wall material volume. The pole sleeve 14a features an axial section profile having a reduced wall thickness in the axial edge region 18a. The axial edge region 18a is arranged on an axial edge of the pole sleeve 14a. On its axial edge, the pole sleeve 14a has a minimum wall thickness. On its axial edge, the pole sleeve 14a has a minimum wall thickness relative to the edge region 18a. In the present exemplary embodiment, the pole sleeve 14a has on its axial edge a wall thickness of at least substantially 0.8 mm. It is conceivable that the pole sleeve 14a has on its axial edge a wall thickness that is smaller than 0.8 mm or a disappearing wall thickness. It is conceivable that the pole sleeve 14a has on its axial edge a wall thickness that is greater than 0.8 mm. In the present embodiment the pole sleeve 14a features a conical course in its axial edge region 18a. The wall thickness increases in the axial edge region 18a with an increasing distance from the axial edge. The wall thickness increases in the axial edge region 18a monotonously with increasing distance from the axial edge.

The pole sleeve 14a has a basis wall thickness 20a, with respect to which the wall thickness in the axial edge region 18a is reduced. Everywhere in the axial edge region 18a the wall thickness is smaller than the basis wall thickness 20a. Outside the axial edge region 18a, the pole sleeve 14a comprises a further region 70a, in which the wall thickness is contiguously equal to the basis wall thickness 20a. The wall thickness is in the further region 70a at least substantially constant. The further region 70a has an axial extension which is at least substantially equivalent to 80% of a total axial extension of the pole sleeve 14a. The further region 70a extends over more than two thirds of a total axial extension of the pole sleeve 14a. The further region 70a and the axial edge region 18a comprise the entire pole sleeve 14a. The basis wall thickness 20a is equivalent to a maximum wall thickness of the pole sleeve 14a. The basis wall thickness 20a has in the present embodiment a value of at least substantially 2.5 mm.

The iron circuit comprises a further pole sleeve 22a, which is arranged spaced apart from the pole sleeve 14a by a gap 24a. The gap 24a is embodied as a magnetically insulating gap 24a. The gap 24a has a width of at least substantially 6.5 mm. It is conceivable that the gap 24a is implemented to be narrower or wider. In the gap 24a a spacer ring is arranged, which is made of a non-magnetizable material. In the present exemplary embodiment, the spacer ring has an axial extension of at least substantially 6 mm. The pole sleeve 14a and the further pole sleeve 22a include the magnetically insulating gap 24a between them in an axial direction. The magnetically insulating gap 24a interrupts the iron circuit. In a mounted state the axial edge of the axial edge region 18a delimits the magnetically insulating gap 24a of the iron circuit. The magnetically insulating gap 24a is spatially arranged axially between the pole sleeve 14a and the further pole sleeve 22a. The axial edge region 18a of the pole sleeve 14a is arranged on a side of the pole sleeve 14a which faces towards the magnetically insulating gap 24a. The further pole sleeve 22a has a basis wall thickness that is equivalent to the basis wall thickness 20a of the pole sleeve 14a. The pole sleeve 14a and the further pole sleeve 22a have a same basis wall thickness 20a. The pole sleeve 14a and the further pole sleeve 22a are arranged coaxially with respect to one another. The pole sleeve 14a and the further pole sleeve 22a are arranged aligned to one another. The pole sleeve 14a and the further pole sleeve 22a have a same outer diameter. With respect to the main flow direction 50a, the pole sleeve 14a is arranged upstream of the further pole sleeve 22a. Relative to the further pole sleeve 22a, the pole sleeve 14a is arranged inlet-side. In a mounted state an axial extension of an arrangement consisting of the pole sleeve 14a, the magnetically insulating gap 24a and the further pole sleeve 22a is larger than an axial extension of the magnet coil 52a.

The pole sleeve 14a and the further pole sleeve 22a respectively encompass the pump chamber 60a. The pole sleeve 14a and the further pole sleeve 22a are arranged radially between the magnet coil 52a and the pump chamber 60a. The further pole sleeve 22a features a chamfer 122a on its edge facing towards the magnetically insulating gap 24a. The chamfer 122a is arranged on an outer perimeter of the further pole sleeve 22a. The chamfer 122a features an angle of at least substantially 45 degrees. It is conceivable that the chamfer 122a features an angle that differs from 45 degrees, e.g. a flatter angle or a steeper angle relative to the outer perimeter. The chamfer 122a has a width of at least substantially 1.5 mm. It is conceivable that the chamfer 122a has a larger width or a smaller width. It is conceivable that the further pole sleeve 22a is embodied without a chamfer.

The axial section profile is derived from a force-displacement characteristic. The force-displacement characteristic shows the dependency of a magnetic force relative to an axial position of the working piston 54a. The magnetic force is provided by the magnetic actuator 16a by way of a magnetic flux generated by the magnetic actuator 16a.

The axial section profile comprises at least one slope 28a. The slope 28a is arranged in the axial edge region 18a of the axial section profile. The slope 28a defines the axial edge region 18a. In the present exemplary embodiment, the axial section profile has a symmetry axis 72a. With respect to the symmetry axis 72a, the axial section profile comprises a further slope 74a, which is implemented symmetrically to the slope 28a and is arranged symmetrically to the slope 28a. The slopes 28a, 74a extend in an axial direction at least substantially over the entire axial edge region 18a. The pole sleeve 14a comprises, on an edge facing towards the magnetically insulating gap 24a, a chamfer formed by the slopes 28a, 74a. The slopes 28a, 74a are arranged on an outer perimeter 68a of the axial edge region 18a. It is also conceivable that the slopes 28a, 74a are arranged on an inner perimeter 66a of the axial edge region 18a. The slopes 28a, 74a are implemented to be at least substantially straight. Along the slopes 28a, 74a, the edge region 18a has an at least substantially constant inclination. It is conceivable that the slopes 28a, 74a have a curvature and are implemented to be, for example, concave or convex. It is also conceivable that the axial edge region 18a comprises sections which have different inclinations and are subsequent to one another in an axial direction, and/or has a bent outer perimeter 68a and/or inner perimeter 66a.

The slopes 28a, 74a respectively have an axial extension and a radial extension which are derived from the force-displacement characteristic. The axial section profile is derived from a value and/or from a gradient of the force-displacement characteristic in a region of the magnetically insulating gap 24a, and/or from a value and/or a gradient of the force-displacement characteristic on the edge of the pole sleeve 14a.

The axial edge region 18a has an axial extension with a value of at least 2 mm. The pole sleeve 14a has in the present exemplary embodiment an axial extension of at least substantially 18 mm. The axial edge region 18a has an axial extension amounting to at least 20% of a total axial extension of the pole sleeve 14a. The axial edge region 18a has an axial extension with a value of maximally 10 mm. The axial edge region 18a has an axial extension amounting to maximally 30% of a total extension of the pole sleeve 14a.

In the present exemplary embodiment the axial edge region 18a has an axial extension of at least substantially 4.7 mm. The axial extension of the axial edge region 18a is at least substantially 25% of a total axial extension of the pole sleeve 14a. It is conceivable that the axial extension of the edge region 18a has a value that differs from 4.7 mm. A ratio of the axial extension of the axial edge region 18a to the wall thickness is at least substantially 1.9.

The slopes 28a, 74a of the axial section profile each include an angle 34a of maximally 30 degrees with the middle axis 32a of the pole sleeve 14a. The slopes 28a, 74a of the axial section profile each include an angle 34a of at least 10 degrees with the middle axis 32a of the pole sleeve 14a (cf. FIG. 4). The slopes 28a, 74a of the axial section profile each include an angle 34a of at least substantially 15 degrees with the middle axis 32a.

The axial section profile comprises at least one step 37a having a height of at least 0.2 mm. In the present exemplary embodiment the axial section profile comprises a further step 76a which is, relative to the symmetry axis 72a, embodied symmetrically to the step 37a and arranged symmetrically to the step 37a. The steps 37a, 76a respectively have a height of at least substantially 0.5 mm. The steps 37a, 76a are arranged on the outer perimeter 68a of the pole sleeve 14a. The steps 37a, 76a delimit the axial edge region 18a. Respectively one of the slopes 28a, 74a is spatially arranged between one of the steps 37a, 76a and the edge of the pole sleeve 14a.

In the present exemplary embodiment the pole sleeve 14a comprises three front surfaces 78a, 80a, 82a. A first one of the front surfaces 78a abuts on the inner perimeter 66a of the pole sleeve 14a. The first front surface 78a is embodied as a circular annulus. The first front surface 78a forms the edge of the pole sleeve 14a (cf. FIG. 5). In a mounted state, the first front surface 78a faces toward the magnetically insulating gap 24a. A further one of the front surfaces 80a has a same orientation as the first front surface 78a and abuts on an outer perimeter 68a of the pole sleeve 14a. The further front surface 80a corresponds to the step 37a of the axial section profile. The further front surface 80a is embodied as a circular annulus. The first front surface 78a and the further front surface 80a are arranged concentrically to one another. The first front surface 78a and the further front surface 80a are connected to one another via the conical course of the outer perimeter 68a of the axial edge region 18a. A third one of the front surfaces 82a is arranged on a further edge of the pole sleeve 14a. The third front surface 82a is in a mounted state arranged facing away from the magnetically insulating gap 24a. The third front surface 82a abuts on the inner perimeter 66a and the outer perimeter 68a of the pole sleeve 14a.

The axial section profile comprises, at least in the axial edge region 18a, a constant inner diameter 38a. In the axial end region 18a, the inner perimeter 66a of the pole sleeve 14a is embodied to be at least substantially smooth. In the axial edge region 18a, the inner perimeter 66a of the pole sleeve 14a is embodied in a shape of a cylinder jacket surface.

The working piston 54a of the beverage pump 10a comprises an armature element 84a, which is entirely made of a magnetizable material. In a rest state, i.e. in case the magnet coil 52a is switched off, the armature element 84a has a rest position in which it partially overlaps axially with the gap 24a that interrupts the iron circuit. In the present exemplary embodiment, in the rest position of the armature element 84a a distance of the armature element 84a from an edge of the pole sleeve 14a facing toward the armature element 84a is at least substantially 10 mm. The axial extension of the axial edge region 18a is at least substantially 47% of the distance of the armature element 84a from an edge of the pole sleeve 14a facing toward the armature element 84a in the rest position of the armature element 84a. When the magnet coil 52a is supplied with a current, a magnetic flux is generated in the iron circuit and the armature element 84a, wherein a magnetic resistance acting counter to this magnetic flux is in particular defined by a remaining gap width between the armature element 84a and the iron circuit. A system of this kind seeks to assume a state in which the magnetic resistance is at a minimum. An actuation force acts onto the armature element 84a, deflecting the armature element 84a out of its rest position counter to a force of the spring element 56a that is embodied as a pump spring. In the present embodiment the armature element 84a is connected to a base body of the working piston 54a by substance-to-substance bond.

The beverage pump 10a comprises a flux-conducting element 86a, which is configured to guide and/or concentrate the magnetic flux generated by the magnetic actuator 16a. The flux-conducting element 86a is configured to augment a magnetic force acting onto the armature element 84a. The flux-conducting element 86a is embodied as a sleeve. The flux-conducting element 86a is arranged within the pump chamber 60a. In a mounted state, the flux-conducting element 86a abuts on the pump chamber wall 62a. The flux-conducting element 86a is arranged radially between the spring element 56a that is embodied as a pump spring and the pump chamber wall 62a.

For the purpose of achieving a pump action, the magnet coil 52a is supplied with a pulse-shaped voltage, and as a result a permanently changing magnetic field is created in a region of the pump chamber 60a. The magnetic field, which changes pulse-like and is conducted through the pole sleeves 14a, 22a results, first of all, with an increasing intensity of the magnetic field, in a deflection of the working piston 54a out of its rest position counter to the force of the spring element 56a that is embodied as a pump spring. A magnetic force acting onto the working piston 54a depends on a magnetic flux density in the location of the armature element 84a, which is in particular determined by a shape of the pole sleeves 14a, 22a. As soon as a current through the magnet coil 52a is reduced, the intensity of the magnetic field thus decreasing, the working piston 54a is moved toward the rest position by the force of the spring element 56a. Preferably herein a diode unit (not shown) is connected upstream of the magnet coil 52*a*, as a result of which the magnet coil 52*a* is supplied only with a half-wave of an AC voltage. In the exemplary embodiment shown the magnet coil 52*a* is configured for an AC voltage of 230 V at 50 Hz.

In a mounted state of the working piston 54*a*, the pump chamber 60*a* comprises a pre-chamber 88*a*, a pressure chamber 90*a* and an outlet chamber 92*a*. The working piston 54*a* comprises a piston valve 94*a* which is, in terms of fluid-mechanics, arranged between the pre-chamber 88*a* and the pressure chamber 90*a*. Relative to a longitudinal axis of the beverage pump 10*a*, the piston valve 94*a* is arranged centrally in the beverage pump 10*a* and centrally in the working piston 54*a*. The piston valve 94*a* is embodied in the shape of a check valve having a pass-through direction from the pre-chamber 88*a* into the pressure chamber 90*a*. The piston valve 94*a* comprises a valve seat, a closure part and a closing spring. The closing spring is configured to pull the closure part onto the valve seat. In a filling stroke, in which the working piston 54*a* is moved through the magnetic field counter to the force of the spring element 56*a* that is embodied as a pump spring, a fluid flows from the pre-chamber 88*a* into the pressure chamber 90*a* through the piston valve 94*a*. In a following pressure stroke, in which the working piston 54*a* is moved via the force of the spring element 56*a*, the fluid is pressed out of the pressure chamber 90*a*. Herein a maximum pressure acting onto the fluid in particular depends on the force of the spring element 56*a*. Herein a distance by which the working piston 54*a* is moved depends on an implementation of the beverage pump 10*a*, in particular on the shape of the pole sleeves 14*a*, 22*a*.

The beverage pump 10*a* comprises two connection elements 96*a*, 98*a*. A first one of the connection elements 96*a* is embodied as an inlet element and is configured for a connection to a water supply, e.g. to a water supply container. The first connection element 96*a* features a connection piece 100*a* for a connection to a hose. It is conceivable that the first connection element 96*a* comprises a connecting coupling. A further one of the connection elements 98*a* is embodied as an outlet element and comprises a connecting coupling 102*a*. It is conceivable that the further connection element 98*a* features a connection piece.

The further one of the spring elements 58*a* is embodied as a damping element. In the present embodiment the further spring element 58*a* is implemented as a helical spring. The working piston 54*a* is float-supported between the two spring elements 56*a*, 58*a*. The working piston 54*a* is at least substantially permanently in contact with the two spring elements 56*a*, 58*a*. It is conceivable that the further spring element 58*a* is embodied as a different type of an elastic element, e.g. as a bellows element and/or as a porous element. The beverage pump 10*a* comprises a support ring 104*a* for a sealing element 106*a*. The sealing element 106*a* is configured for sealing the pre-chamber 88*a* against the pressure chamber 90*a*. In a mounted state the working piston 54*a* penetrates through the support ring 104*a*. Together with the working piston 54*a* the sealing element 106*a* realizes a slide sealing.

The beverage pump 10*a* comprises an outlet valve 108*a*, which is arranged in the outlet chamber 92*a*. The outlet chamber 92*a* is implemented by the further connection element 98*a*. The outlet valve 108*a* is arranged, in terms of fluid mechanics, between the pressure chamber 90*a* and the outlet chamber 92*a* of the beverage pump 10*a*. The outlet valve 108*a* is arranged, relative to the longitudinal axis of the beverage pump 10*a*, centrally in the beverage pump 10*a* and centrally in the outlet chamber 92*a*. The outlet chamber 92*a* is arranged, in terms of fluid mechanics, between the pressure chamber 90*a* and an outlet opening. The outlet valve 108*a* is embodied as a check valve having a pass-through direction from the pressure chamber 90*a* to the outlet chamber 92*a*. The pressure chamber element features a circle-shaped opening forming a valve seat for the outlet valve 108*a*. The outlet valve 108*a* comprises a closure part which is supported in an axially movable fashion, and a closing spring which, in a mounted state, presses the closure part against the valve seat.

FIGS. 6 to 11 show four further exemplary embodiments of the invention. The following description and the drawings are substantially limited to the differences between the exemplary embodiments, wherein regarding identically denominated structural components, in particular regarding structural components having the same reference numerals, principally the drawings and/or the description of the other exemplary embodiments, in particular as regards FIGS. 1 to 5, may also be referred to. For distinguishing between the exemplary embodiments, the letter a has been added to the reference numerals of the exemplary embodiment of FIGS. 1 to 5. In the exemplary embodiments of FIGS. 6 to 11, the letter a has been replaced by the letters b to e.

FIG. 6 shows a further exemplary embodiment of a beverage pump 10*b* for a domestic appliance. The beverage pump 10*b* has a structure that is analogous to the structure of the previous exemplary embodiment. Analogously to the previous exemplary embodiment, the beverage pump 10*b* comprises a pole sleeve 14*b*. The pole sleeve 14*b* is configured for conducting a magnetic flux generated by a magnetic actuator 16*b*. The pole sleeve 14*b* is embodied at least substantially in the shape of a hollow cylinder. The pole sleeve 14*b* has a middle axis 32*b*, which is equivalent to a cylinder axis. The pole sleeve 14*b* comprises an inner perimeter 66*b* and an outer perimeter 68*b*. In a mounted state the pole sleeve 14*b* is arranged coaxially with a pump chamber of the beverage pump 10*b*. In the present exemplary embodiment the pole sleeve 14*b* is embodied to be rotationally symmetrical. The pole sleeve 14*b* features a substantially changing magnetic permeability along a main flow direction of the liquid that is to be conveyed. Analogously to the previous exemplary embodiment, the pole sleeve 14*b* comprises an axial section profile which has a reduced wall thickness in an axial edge region 18*b*. The axial edge region 18*b* is arranged at an axial edge of the pole sleeve 14*b*. On the axial edge, the pole sleeve 14*b* has a minimum wall thickness. On the axial edge, the pole sleeve 14*b* has a minimum wall thickness relative to the edge region 18*b*.

Differently from the previous exemplary embodiment the axial section profile features a multiple stepping 30*b*. The multiple stepping 30*b* is arranged in the axial edge region 18*b* of the axial section profile. The multiple stepping 30*b* defines the axial edge region 18*b*. The axial section profile has a symmetry axis 72*b*. The axial section profile features a further multiple stepping 110*b* which is, relative to the symmetry axis 72*b*, embodied symmetrically to the multiple stepping 30*b* and arranged symmetrically to the multiple stepping 30*b*. In the present exemplary embodiment the multiple steppings 30*b*, 110*b* each comprise three steps. It is conceivable that the multiple steppings 30*b*, 110*b* have a number of steps differing from three, e.g. two steps or four steps or more. In the present exemplary embodiment the steps feature an at least substantially identical step height.

The steps are arranged in the axial edge region 18*b* in such a way that they are equally distributed in an axial direction. It is also conceivable that the steps have different step heights and/or are arranged in such a way that they are distributed irregularly in an axial direction.

FIG. 7 shows a further exemplary embodiment of a beverage pump 10c for a domestic appliance. The beverage pump 10c is designed analogously to the previous exemplary embodiment. Analogously to the previous exemplary embodiment, the beverage pump 10c comprises a pole sleeve 14c. The pole sleeve 14c is configured for conducting a magnetic flux generated by a magnetic actuator. The pole sleeve 14c is embodied at least substantially in the shape of a hollow cylinder. The pole sleeve 14c has a middle axis 32c, which is equivalent to a cylinder axis. The pole sleeve 14c comprises an inner perimeter 66c and an outer perimeter 68c. In a mounted state the pole sleeve 14c is arranged coaxially with a pump chamber 60c of the beverage pump 10c. In the present exemplary embodiment, the pole sleeve 14c is implemented to be rotationally symmetrical. The pole sleeve 14c has, along a main flow direction of the liquid that is to be conveyed, a substantially changing magnetic permeability. The pole sleeve 14c comprises, analogously to the previous exemplary embodiment, an axial section profile having a reduced wall thickness in an axial edge region 18c. The axial edge region 18c is arranged at an axial edge of the pole sleeve 14c. On its axial edge the pole sleeve 14c has a minimum wall thickness. On its axial edge the pole sleeve 14c has a minimum wall thickness relative to the edge region 18c.

Differently from the previous exemplary embodiment, the axial section profile comprises at least a section 36c having a constant reduced wall thickness and featuring an axial extension of at least 2 mm. In the present exemplary embodiment, the section 36c having the constant reduced wall thickness features an axial extension of maximally 10 mm. The section 36c having the constant reduced wall thickness features an axial extension of at least substantially 4.7 mm. The section 36c having the constant reduced wall thickness is arranged in the axial edge region 18c. The section 36c having the constant reduced wall thickness defines the axial edge region 18c.

The axial section profile has a symmetry axis 72c. The axial section profile has a further section 112c with a constant reduced wall thickness. The further section 112c is implemented symmetrically to the section 36c having the constant reduced wall thickness and is arranged symmetrically to the section 36c having the constant reduced wall thickness. The sections 36c, 112c of the axial section profile, which have a constant reduced wall thickness, are each embodied rectangularly. In the present exemplary embodiment the axial section profile is composed of rectangles.

In the present exemplary embodiment the pole sleeve 14c is embodied in a multi-part implementation. The pole sleeve 14c comprises two sleeve elements 114c, 116c, each of which is embodied as a hollow cylinder. In a mounted state the sleeve elements 114c, 116c are arranged concentrically to one another. In a mounted state the sleeve elements 114c, 116c are arranged aligned with one another. The sleeve elements 114c, 116c have a same inner diameter. A first one of the sleeve elements 114c has a basis wall thickness of the pole sleeve 14c. A further one of the sleeve elements 116c has a wall thickness that is reduced relative to the basis wall thickness. The further one of the sleeve elements 116c has an outer diameter which is smaller than an outer diameter of the first sleeve element 114c.

FIG. 8 shows a further exemplary embodiment of a beverage pump 10d for a domestic appliance. The beverage pump 10d has a structure that is analogous to the previous exemplary embodiment. Analogously to the previous exemplary embodiment, the beverage pump 10d comprises a pole sleeve 14d. The pole sleeve 14d is configured for conducting a magnetic flux generated by a magnetic actuator 16d. The pole sleeve 14d is embodied at least substantially in the shape of a hollow cylinder. The pole sleeve 14d has a middle axis 32d, which is equivalent to a cylinder axis. The pole sleeve 14d has an inner perimeter 66d and an outer perimeter 68d. In a mounted state the pole sleeve 14d is arranged coaxially with a pump chamber 60d of the beverage pump 10d. In the present exemplary embodiment the pole sleeve 14d is implemented to be rotationally symmetrical. The pole sleeve 14d has, along a main flow direction of the liquid that is to be conveyed, a substantially changing magnetic permeability and comprises, analogously to the previous exemplary embodiment, an axial section profile having a reduced wall thickness in an axial edge region 18d. The axial edge region 18d is arranged at an axial edge of the pole sleeve 14d. On the axial edge the pole sleeve 14d has a minimum wall thickness. On the axial edge the pole sleeve 14d has a minimum wall thickness relative to the edge region 18d.

The pole sleeve 14d has a basis wall thickness 20d, relative to which the wall thickness is reduced in the axial edge region 18d (cf. FIG. 9). All over the axial edge region 18d, the wall thickness is smaller than the basis wall thickness 20d. On an edge of the pole sleeve 14d facing away from the axial edge region 18d, the pole sleeve 14d comprises a further region 70d in which the wall thickness is contiguously equivalent to the basis wall thickness 20d. The wall thickness is in the further region 70d at least substantially constant. The further region 70d has an axial extension which is at least substantially equivalent to 60% of a total axial extension of the pole sleeve 14d. The axial section profile comprises a section 36d having a constant reduced wall thickness and featuring an axial extension of at least 2 mm. In the further section 70d the axial section profile features a rectangle. In the section 36d the axial section profile features a rectangle. The basis wall thickness 20d is equivalent to a maximum wall thickness of the pole sleeve 14d. The basis wall thickness 20d has in the present exemplary embodiment a value of at least substantially 3.5 mm.

The iron circuit comprises, analogously to the previous exemplary embodiments, a further pole sleeve 22d, which is arranged spaced apart from the pole sleeve 14d by a gap 24d. The gap 24d is embodied as a magnetically insulating gap 24d and features in the present exemplary embodiment a non-magnetizable material. The pole sleeve 14d and the further pole sleeve 22d include the magnetically insulating gap 24d between them in an axial direction. The magnetically insulating gap 24d interrupts the iron circuit. In a mounted state the axial edge of the axial edge region 18d delimits the magnetically insulating gap 24d of the iron circuit. The magnetically insulating gap 24d is spatially arranged axially between the pole sleeve 14d and the further pole sleeve 22d. The axial edge region 18d of the pole sleeve 14d is arranged on a side of the pole sleeve 14d facing towards the magnetically insulating gap 24d. The further pole sleeve 22d has a basis wall thickness which is equivalent to the wall thickness of the section 36d of the pole sleeve 14d.

The axial section profile comprises at least a slope 28d. The slope 28d is arranged in the axial edge region 18d of the axial section profile. The slope 28d defines the axial edge region 18d. The axial section profile has in the present exemplary embodiment a symmetry axis 72d. The axial section profile comprises a further slope 74d which is, relative to the symmetry axis 72d, implemented symmetrically to the slope 28d and is arranged symmetrically to the slope 28d. The slopes 28d, 74d extend in an axial direction at least substantially over the entire axial edge region 18d. On its edge facing toward the magnetically insulating gap 24d, the pole sleeve 14d has a chamfer implemented by the slopes 28d, 74d. The slopes 28d, 74d are arranged on an outer perimeter 68d of the axial edge region 18d. The axial section profile is, analogously to the previous exemplary embodiments, derived from a force-displacement characteristic. The axial edge region 18d features an axial extension with a value of at least 2 mm. In the present exemplary embodiment the axial edge region 18d features an axial extension of at least substantially 7 mm. The slopes 28d, 74d of the axial section profile each include an angle of at least substantially 15 degrees with the middle axis 32d.

The axial section profile comprises at least a step 37d having a height of at least substantially 0.5 mm. The axial section profile comprises a further step 76d which is, relative to the symmetry axis 72d, implemented symmetrically to the step 37d and is arranged symmetrically to the step 37d. The steps 37d, 76d are arranged on the outer perimeter 68d of the pole sleeve 14d. Respectively one of the slopes 28d, 74d is spatially arranged between one of the steps 37d, 76d and the edge of the pole sleeve 14d. The axial section profile comprises a further section 112d with a constant reduced wall thickness which is, relative to the symmetry axis 72d, implemented symmetrically to the section 36d having a constant reduced wall thickness and arranged symmetrically to the section 36d having a constant reduced wall thickness. Differently from the preceding exemplary embodiments, the axial section profile comprises at least one step 40d on the inner perimeter 66d. On the inner perimeter 66d, the axial section profile comprises a further step 118d which is, relative to the symmetry axis 72d, embodied symmetrically to the step 40d and arranged symmetrically to the step 40d. The steps 40d, 118d arranged on the inner perimeter 66d delimit the axial edge region 18d. The steps 40d, 118d arranged on the inner perimeter 66d delimit respectively one of the sections 36d, 112d.

In an alternative implementation the pole sleeve 14d may be embodied in a multi-part implementation, for example in a two-part implementation. In this case the pole sleeve 14d comprises an outer sleeve element and an inner sleeve element. The sleeve elements are, in a mounted state, arranged concentrically to one another. The outer sleeve element encompasses the inner sleeve element at least substantially completely. The inner sleeve element has a wall thickness which corresponds to a step height of the steps 40d, 118d arranged on the inner perimeter 66d of the pole sleeve 14d. An axial extension of the inner sleeve element is equivalent to an axial extension of the further region 70d, in which the wall thickness of the pole sleeve 14d is contiguously equivalent to the basis wall thickness 20d.

The working piston 54d of the beverage pump 10d comprises, analogously to the preceding exemplary embodiments, an armature element 84d which is entirely made of a magnetizable material. Differently from the preceding exemplary embodiments, the beverage pump 10d comprises no flux-conducting element arranged in the pump chamber 60d. In a mounted state of the working piston 54d, the pump chamber 60d comprises a pre-chamber 88d, a pressure chamber 90d and an outlet chamber 92d. The working piston 54d comprises a piston valve 94d which is, in terms of fluid mechanics, arranged between the pre-chamber 88d and the pressure chamber 90d. The beverage pump 10d comprises an outlet valve 108d, which is arranged in the outlet chamber 92d. Differently from the preceding exemplary embodiments, the pump chamber 60d differs from a cylinder shape in a region of the pole sleeve 14d. The pump chamber 60d comprises a section 120d with a reduced inner diameter. The section 120d is in a mounted state, relative to a direction of the middle axis 64d, arranged at a same level as the further region 70d of the pole sleeve 14d. Axial extensions of the section 120d and of the further region 70d are equivalent to each other. The pump chamber 60d comprises a radial step, which corresponds to the step 40d of the pole sleeve 14d. In the present exemplary embodiment a minimum inner diameter of the pole sleeve 14d is in the further region 70d smaller than a maximum diameter of the armature element 84d. It is also conceivable that the minimum inner diameter of the pole sleeve 14d is equal to or smaller than the maximum diameter of the armature element 84d.

The beverage pump 10d comprises two connection elements 96d, 98d. A first one of the connection elements 96d is embodied as an inlet element and is configured for a connection to a water supply, e.g. to a water supply container. The first connection element 96d comprises a connection piece 100d for a connection to a hose. A further one of the connection elements 98d is embodied as an outlet element and comprises a connecting coupling 102d. The further spring element 58d is embodied as a damping element. The working piston 54d is float-supported between the two spring elements 56d, 58d. The beverage pump 10d comprises a support ring 104d for a sealing element 106d. The sealing element 106d is configured for sealing the pre-chamber 88d against the pressure chamber 90d.

FIG. 11 shows a further exemplary embodiment of a beverage pump 10e for a domestic appliance. The beverage pump 10e is designed analogously to the preceding exemplary embodiments. Analogously to the preceding exemplary embodiments, the beverage pump 10e comprises a pole sleeve 14e. The pole sleeve 14e is configured for conducting a magnetic flux generated by a magnetic actuator. The pole sleeve 14e is implemented at least substantially in the shape of a hollow cylinder. The pole sleeve 14e has a middle axis 32e, which is equivalent to a cylinder axis. The pole sleeve 14e comprises an inner perimeter 66e and an outer perimeter 68e. In a mounted state, the pole sleeve 14e is arranged coaxially with a pump chamber of the beverage pump 10e. The pole sleeve 14e has, along a main flow direction of the liquid that is to be conveyed, a substantially changing magnetic permeability. The pole sleeve 14e has a reduced magnetic permeability in an axial edge region 18e. The pole sleeve 14e has a reduced effective wall material volume in the axial edge region 18e.

Differently from the preceding exemplary embodiments, the axial edge region 18e is embodied in a sinuate manner. The pole sleeve 14e comprises a plurality of incisions 124e-134e in the axial edge region 18e. In the present exemplary embodiment, the pole sleeve 14e comprises six incisions 124e-134e. The incisions 124e-134e are arranged in such a way that they are regularly distributed in a circumferential direction. The incisions 124e-134e have an angular distance from a respectively neighboring incision 124e-134e of at least substantially 60 degrees. It is conceivable that the pole sleeve 14e comprises a smaller number of incisions 124e-134e, e.g. three or four incisions. It is conceivable that the pole sleeve 14e comprises a greater number of incisions 124e-134e, e.g. at least seven, eight, nine, ten or 100 incisions. It is conceivable that the axial edge region 18e of the pole sleeve 18e is implemented like a comb. In the present exemplary embodiment the incisions 124e-134e are implemented to be shaped like a trapezoid. The incisions 124e-134e each have a depth of at least substantially 5 mm. In the axial edge region 18e, the wall material volume of the pole sleeve 14e is reduced by a total volume of the incisions 124e-134e. In the present exemplary embodiment, the incisions 124e-134e are implemented analogously to one another. In the present exemplary embodiment, the incisions 124e-134e have been punched out of a wall 136e of the pole sleeve 14e. It is conceivable that the incisions are implemented differently and that the pole sleeve 14e comprises, for example, two or more shapings of different incisions. The incisions 124e-134e are arranged in such a way that they are situated opposite each other respectively in pairs. The pole sleeve 14e is embodied to be crown-shaped.

In the present exemplary embodiment the pole sleeve 14e comprises six teeth 138e-148e (cf. FIG. 10). It is conceivable that the pole sleeve 14e comprises a number of teeth that differs from six. The teeth 138e-148e are oriented in an axial direction and project beyond a base body 150e of the pole sleeve 14e in an axial direction. The teeth 138e-148e respectively have a height of at least substantially 5 mm. The teeth 138e-148e are embodied analogously to one another and are regularly distributed in a circumferential direction. The teeth 138e-148e have an angular distance from a respectively neighboring tooth of at least substantially 60 degrees. It is conceivable that the teeth 138e-148e are arranged along the circumferential direction in a different fashion that is deemed expedient by someone skilled in the art. The teeth 138e-148e are each embodied to be trapezoid-shaped. It is conceivable that the incisions 124e-134e are embodied to be wave-shaped in an alternative implementation. The pole sleeve 14e is embodied to be slitted, featuring a slit 152e which entirely penetrates the wall 136e of the pole sleeve 14e in an axial and in a radial direction.

REFERENCE NUMERALS 10 beverage pump
12 domestic appliance
14 pole sleeve
16 magnetic actuator
18 edge region
20 basis wall thickness
22 pole sleeve
24 gap
28 slope
30 stepping
32 middle axis
34 angle
36 section
37 step
38 inner diameter
40 step
42 control unit
44 drip tray
46 recipient accommodation
48 output unit
50 main flow direction
52 magnet coil
54 working piston
56 spring element
58 spring element
60 pump chamber
62 pump chamber wall
64 middle axis
66 inner perimeter
68 outer perimeter
70 region
72 symmetry axis
74 slope
76 step
78 front surface
80 front surface
82 front surface
84 armature element
86 flux-conducting element
88 pre-chamber
90 pressure chamber
92 outlet chamber
94 piston valve
96 connection element
98 connection element
100 connection piece
102 connection coupling
104 support ring
106 sealing element
108 outlet valve
110 stepping
112 section
114 sleeve element
116 sleeve element
118 step
120 section
122 chamfer
124 incision
126 incision
128 incision
130 incision
132 incision
134 incision
136 wall
138 tooth
140 tooth
142 tooth
144 tooth
146 tooth
148 tooth
150 base body
152 slit

The invention claimed is:

1. A domestic appliance, comprising:
a beverage pump configured to convey a liquid, the beverage pump comprises a magnetic actuator, a working piston, a pump chamber in which the working piston is guided, and a pole sleeve for conducting a magnetic flux generated by the magnetic actuator, wherein
the pole sleeve has, along a main flow direction of the liquid, a substantially changing magnetic permeability, and the pole sleeve has a reduced magnetic permeability in an axial edge region.

2. The domestic appliance according to claim 1, wherein the pole sleeve has a reduced effective wall material volume in its axial edge region.

3. The domestic appliance according to claim 1, wherein the axial edge region of the pole sleeve is embodied in a sinuate manner.

4. The domestic appliance according to claim 1, wherein the pole sleeve has a reduced wall thickness in the axial edge region.

5. The domestic appliance according to claim 1, wherein the pole sleeve has a basis wall thickness with respect to which the wall thickness is reduced in the axial edge region.

6. The domestic appliance according to claim 1, wherein the beverage pump comprises at least one further pole sleeve, which is arranged in such a way that it is spaced apart from the pole sleeve by a gap.

7. The domestic appliance according to claim 1, wherein the pole sleeve has an axial section profile derived from a force-displacement characteristic.

8. The domestic appliance according to claim 7, wherein the axial section profile comprises at least one slope and/or a multiple stepping.

9. The domestic appliance at least according to claim 7, wherein the axial section profile comprises at least one slope, which includes an angle of no more than 30 degrees with a middle axis of the pole sleeve.

10. The domestic appliance at least according to claim 7, wherein the axial section profile comprises at least one section having a constant reduced wall thickness and having an axial extension of at least 2 mm.

11. The domestic appliance at least according to claim 7, wherein the axial section profile comprises at least one step, which has a height of at least 0.2 mm.

12. The domestic appliance at least according to claim 7, wherein the axial section profile comprises at least one step on an inner perimeter.

13. The domestic appliance according to claim 1, wherein the axial edge region has an axial extension with a value of at least 2 mm.

14. The domestic appliance according to claim 1, wherein the axial edge region has an axial extension with a value of maximally 10 mm.

15. The domestic appliance according to claim 1, wherein the pole sleeve has a constant inner diameter at least in the axial edge region.

16. The domestic appliance according to claim 1, further comprising
a pump chamber wall that defines the pump chamber, wherein
the pole sleeve surrounds the pump chamber wall to encompass the pump chamber.

17. The domestic appliance according to claim 16, wherein the pump chamber wall is a piston guidance.

18. The domestic appliance according to claim 1, wherein the pole sleeve is arranged outside the pump chamber, which is defined by a pump chamber wall, wherein the pole sleeve abuts the pump chamber wall.

* * * * *